G. M. CURTIS.
ELECTRIC HEATER FOR INCUBATORS, BROODERS, AND THE LIKE.
APPLICATION FILED APR. 30, 1907.

985,983.

Patented Mar. 7, 1911.

WITNESSES:
Clarence W. Carroll
A. R. Selden.

INVENTOR:
Grant M. Curtis

UNITED STATES PATENT OFFICE.

GRANT M. CURTIS, OF BUFFALO, NEW YORK, ASSIGNOR TO CYPHERS INCUBATOR COMPANY, OF BUFFALO, NEW YORK, A CORPORATION OF NEW YORK.

ELECTRIC HEATER FOR INCUBATORS, BROODERS, AND THE LIKE.

985,983.

Specification of Letters Patent. Patented Mar. 7, 1911.

Application filed April 30, 1907. Serial No. 371,185.

*To all whom it may concern:*

Be it known that I, GRANT M. CURTIS, a citizen of the United States, and resident of Buffalo, in the county of Erie and State of New York, have invented certain new and useful Improvements in Electric Heaters for Incubators, Brooders, and the Like, of which the following is a specification.

This invention relates to heating means for incubators, and consists in the apparatus hereinafter described and claimed. The object of the invention is to produce a simple device, which may be inserted in any incubator without substantial change therein, and which may, by connection with an ordinary electric lamp socket take ordinary electric current for lighting purposes and convert it into heat for incubation.

Figure 1:
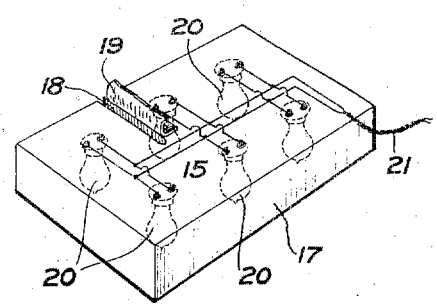
Figure 2:
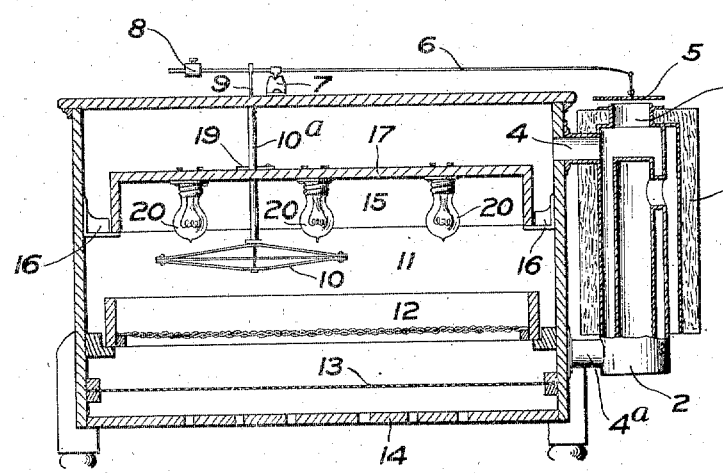

In the drawings:—Figure 1 is a perspective view of a heater embodying the present invention; and Fig. 2 is a vertical, central longitudinal section through an incubator containing the heater.

In the drawings, Fig. 1 represents an ordinary incubator, having the ordinary incubator heater 1 attached thereto, whereby the incubator may be heated by means of a lamp. In the incubator here shown the said heater has an air inlet 2 at the bottom; an air outlet 3 at the top, which is connected with the said air inlet; an air discharge pipe 4 into the upper portion of the interior of the incubator; a damper 5 for closing the outlet 3; a damper rod 6 pivoted on the standard 7, and provided with the counterbalance weight 8; and a thermostat rod 9 attached to a thermostat 10. The thermostat 10 is placed inside the egg chamber 11, so as to be affected by the same heat to which the eggs are subjected. In the egg chamber is the egg tray 12, underneath which is preferably a porous diaphragm 13 entirely across the bottom part of the egg chamber, and underneath the porous diaphragm may be the perforated bottom 14.

In the top of the egg chamber is supported the heater 15. It may rest upon brackets 16, so set that air may pass up around the outside of the heater 15 and through the passage 4, and thence out through the outlet 3, when the damper 5 is raised.

When the heat in the egg chamber 11 exceeds the selected limit, the rod is pulled downward by the thermostat 10, and the damper 5 is raised, thus allowing the heated air to pass out from the upper portion of the incubator, and allowing the cooler air to pass in at the bottom. In some incubators there is an air inlet 4ª in the space between the porous diaphragm 13 and the egg tray 12.

The electric heater comprises a rectangular box 17, open at the bottom, and having a slot 18 through its edge and part way in its top to receive the support 10ª of the thermostat. This slot is covered by a piece of felt 19 which prevents air from passing in and out through said slot, but permits the insertion and removal of the heater box 17 without disturbing the supporting rod 10ª of the thermostat. In the box 17 is a heating means, such as suitable electrical resistance, which, when current is passed through the resistance, will become heated, and radiate the heat in the neighboring air. In the present instance, the resistance consists of a series of electric lamps 20 connected by suitable wiring with a flexible cord 21 which is connected with a source of electric current.

Any ordinary hot air incubator may easily be changed into an electrically heated incubator, by merely inserting the detached support or box 17 into the upper part of the egg chamber, and supporting the same upon suitable brackets or cleats therein.

When it is desired to use the novel form of heater described herein, in connection with a thermostat arranged to make and break the current through the heater and thereby regulate the temperature of the incubator, as shown, for example, in United States patent to Perkins, No. 745,458, dated December 1, 1903, the brackets 16 may be arranged to constitute an air-tight joint with the box 17 of the heater, since no air circulation is necessary in such a case. When the heater is so used the felt 19 covering the slot 18 acts to prevent the passage of heated air through this slot, thereby economizing the heat within the egg chamber.

What I claim is:—

1. An electric heater for incubators, brooders, and the like, having, in combination, a support in the form of a substantially flat plate provided with a recess extending from one edge but otherwise imperforate, yielding means for closing said recess, and an electric heating device mounted upon the support.

2. An electric heater for incubators, brooders, and the like, having, in combination, a support comprising a substantially flat base plate with depending marginal flanges and a recess extending inwardly from one edge, and incandescent electric lamps mounted upon the lower surface of the support.

GRANT M. CURTIS.

Witnesses:
  ROBT. H. ESSEX,
  S. B. MCALLISTER.